(No Model.)
C. CARLETON.
MICROMETER CALIPERS.
No. 292,409. Patented Jan. 22, 1884.
Fig. 1.
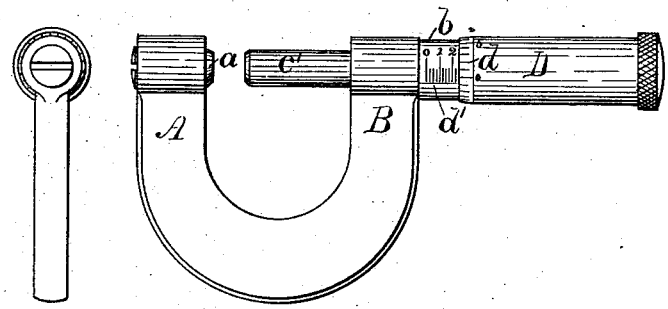
Fig. 2.
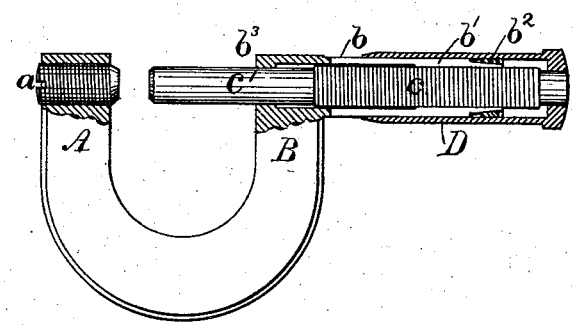
Fig. 3. Fig. 4.
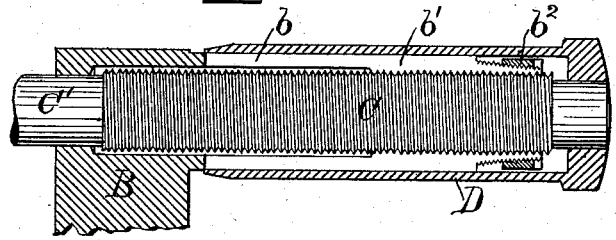 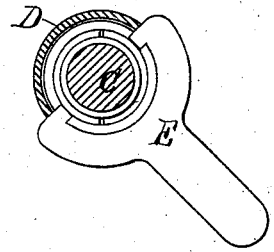
WITNESSES:
C. H. Luther Jr.
Fred E. Field
INVENTOR:
Cyrus Carleton
by Joseph A. Miller & Co.
Attys

UNITED STATES PATENT OFFICE.

CYRUS CARLETON, OF PROVIDENCE, RHODE ISLAND, ASSIGNOR TO THE BROWN & SHARPE MANUFACTURING COMPANY, OF SAME PLACE.

MICROMETER-CALIPERS.

SPECIFICATION forming part of Letters Patent No. 292,409, dated January 22, 1884.

Application filed December 17, 1883. (No model.)

*To all whom it may concern:*

Be it known that I, CYRUS CARLETON, of the city and county of Providence, State of Rhode Island, have invented a new and useful Improvement in Micrometer-Calipers; and I hereby declare that the following is a full, clear, and exact description of the same, reference being had to the accompanying drawings, forming part of this specification.

This invention has reference to an improvement in micrometer-calipers in which the screw-thread is protected against injury; and it consists in the peculiar and novel construction of the calipers, as will be more fully set forth hereinafter.

Micrometer-calipers have been heretofore constructed with the nut in which the micrometer-screw turns secured to the arm, and with a clamp to regulate the bearing of the nut on the screw placed near the arm. Such a construction has been proven in practice defective.

A micrometer-calipers is an instrument designed to measure the smallest and almost infinitesimal differences in the thickness of any material. The bearing of the micrometer-screw in the nut and the relation of the revolving sleeve with the nut-sleeve must be such that nothing but the twining of the screw can change the distance between the anvil and screw or effect the measurement.

Figure 1 is a side view and end view of my improved micrometer-calipers. Fig. 2 is a side view, shown partly in section. Fig. 3 is an enlarged sectional view of the arm in which the micrometer-screw is supported. Fig. 4 is an end view of the micrometer-screw and nut, showing the wrench by which the clamping-ring is turned, so as to adjust the bearing of the nut on the screw.

In the drawings, A is the free end of the U-shaped arm forming the frame of the micrometer. $a$ is the adjustable abutment, consisting of a screw-threaded post secured in the end of the arm A. The arm B is provided with the cylindrical extension $b$, made in one piece with the arms A and B. The extension $b$ is provided with the nut $b'$, in which the screw C has its bearing, and in which it turns to move the same laterally. By forming the nut in the extension $b$ of the arm B a more rigid support is secured than can be secured when the extension is made separate from the arm and secured thereto in any manner, but more particularly so than when, as heretofore constructed, the extension is secured to the arm by a screw-thread. To secure such accuracy in the measurement as is required in a micrometer the screw C must be held in the nut $b'$, so that while it can be turned readily, it will bear firmly on the screw-threads of the nut. For this purpose the extension $b$ is slit longitudinally by a saw-cut, and the clamp-ring or thimble $b^2$ is screwed over the end of the extension $b$, to adjust the bearing of the nut on the micrometer-screw.

In the drawings the clamp-ring $b^2$ is shown as threaded and fitting a tapering screw-thread formed on the end of the nut $b'$. By thus clamping the nut at the point of its bearing on the screw an accurate and rigid adjustment is secured and all yielding or spring prevented. In the former construction the clamping device was secured near the arm B at or nearly at the end of the slit, and the spring of the metal allowed the nut to open when the end of the micrometer-screw was forced against any plate or other material to be measured. The portion or arbor of the micrometer-screw extending through the arm B is made cylindrical, and passes through the contracted opening $b^3$, giving a firm bearing to the same, and preventing dirt or dust from reaching the screw-thread. The sleeve D is secured to the outward end of the micrometer-screw C, so as to turn with the same. The sleeve D passes over and incloses the extension $b$. The open end of the sleeve D is provided with a graduated scale, which, in connection with the scale $d'$ on the extension $b$, indicates the distance between the abutment or anvil $a$ and the end of the cylindrical projection or arbor of the micrometer-screw $c'$. The bearing of the nut $b'$ on the screw C is adjusted by turning the sleeve D sufficiently beyond the clamp-ring $b^2$ to allow the wrench E to grasp the ring, as is shown in Fig. 4. By this construction the screw-thread is not only protected against injury, but the rigidity and accuracy of the instrument is maintained.

Having thus described my invention, I claim as new and desire to secure by Letters Patent—

1. The combination, with the U-shaped frame A B, having extension $b$ integral therewith, longitudinally slitted and tapered at the end, as described, of the compressing-thimble $b^2$ on the tapered end of said extension, and the micrometer-screw C, passing longitudinally through said extension, substantially as described.

2. A micrometer-calipers consisting of a U-shaped frame and a slitted extension, provided with a nut at its end, formed in one piece, a micrometer-screw provided with a plain cylindrical arbor, and a clamping-ring constructed to regulate the bearing of the nut on the screw, as described.

3. The combination, with the U-shaped frame A B, having extension $b$ integral therewith, said extension longitudinally slitted and tapered at the end, as described, of the compressing-thimble $b^2$ on the end of said extension, the micrometer-screw passing through the extension, and the sleeve D, attached to the micrometer-screw and extending over the extension, substantially as described.

In witness whereof I have hereunto set my hand.

CYRUS CARLETON.

Witnesses:
M. F. BLIGH,
J. A. MILLER, Jr.